(12) United States Patent
Maat

(10) Patent No.: US 6,940,691 B2
(45) Date of Patent: Sep. 6, 2005

(54) ELECTRICALLY RESISTIVE HEATING DEVICE FOR DATA STORAGE SYSTEMS

(75) Inventor: Stefan Maat, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 250 days.

(21) Appl. No.: 10/426,748

(22) Filed: Apr. 30, 2003

(65) Prior Publication Data

US 2004/0218302 A1 Nov. 4, 2004

(51) Int. Cl.[7] ............................................. G11B 5/147
(52) U.S. Cl. ........................................................ 360/126
(58) Field of Search ................................. 360/126, 128, 360/125, 123, 313, 59; 219/216

(56) References Cited

U.S. PATENT DOCUMENTS

| | | | |
|---|---|---|---|
| 4,296,309 A | * 10/1981 | Shinmi et al. ............... 347/204 |
| 5,991,113 A | 11/1999 | Meyer et al. | |
| 6,054,330 A | * 4/2000 | Phipps et al. ................... 438/3 |
| 6,218,086 B1 | 4/2001 | Binnig et al. | |
| 6,233,206 B1 | * 5/2001 | Hamann et al. ......... 369/13.01 |
| 6,493,183 B1 | * 12/2002 | Kasiraj et al. ............... 360/126 |
| 6,822,819 B1 | * 11/2004 | Gillis et al. .................... 360/59 |
| 2002/0191326 A1 | * 12/2002 | Xu et al. ....................... 360/75 |
| 2003/0021191 A1 | 1/2003 | Hsu et al. | |
| 2003/0035237 A1 | * 2/2003 | Lille ....................... 360/77.07 |
| 2004/0027709 A1 | * 2/2004 | Hamaguchi et al. .......... 360/59 |
| 2004/0027728 A1 | * 2/2004 | Coffey et al. ................ 360/313 |
| 2004/0114268 A1 | * 6/2004 | Satoh et al. ................... 360/75 |
| 2004/0165305 A1 | * 8/2004 | Nishiyama .................... 360/75 |
| 2005/0024773 A1 | * 2/2005 | Lille .......................... 360/128 |
| 2005/0024774 A1 | * 2/2005 | Fontana et al. ............. 360/128 |

OTHER PUBLICATIONS

U. Drechsler, et al., "Cantilevers with nano–heaters for thermomechanical storage application fabricated with mix & match e–beam & optical lithography", presented at the Micro– and Nano–Engineering conference in Lugano, Switzerland on Sep. 16–19, 2002.

* cited by examiner

*Primary Examiner*—Allen Cao
(74) *Attorney, Agent, or Firm*—Thomas R. Berthold

(57) ABSTRACT

An electrically resistive heater in a data storage system is formed of a chemically disordered $Cr_xV_{100-x}$ alloy. The alloy exhibits a high temperature coefficient of resistance ($T_{CR}$) so that the heater temperature can be inferred from its resistance, minimal resistance vs. temperature hysteresis upon heating and cooling, a high melting point, and temporal stability of resistance at elevated temperatures. The resistive heater is used in data storage systems, including magnetic recording hard disk drives that uses heaters to thermally assist the recording or induce protrusion of the write head pole tips to reduce the head-disk spacing, and atomic force microscopy (AFM) based systems that use "nanoheaters" on cantilever tips for either thermally-assisted recording on magnetic media or thermo-mechanical recording on polymer-based media.

6 Claims, 5 Drawing Sheets

ELECTRICALLY RESISTIVE HEATING DEVICE FOR DATA STORAGE SYSTEMS

TECHNICAL FIELD

This invention relates to electrically resistive heating devices, and more particularly to heaters used in data storage systems, such as "thermally assisted" magnetic recording (TAMR) and atomic force microscopy (AFM) based data storage systems.

BACKGROUND OF THE INVENTION

Resistive heating devices have applications in magnetic recording data storage systems, such as hard disk drives. One such application is TAMR. In conventional magnetic recording hard disk drives, digital information is stored in the magnetic media by using a miniaturized thin film inductive write head. The write head is patterned on the trailing surface of a slider that also has an air-bearing surface (ABS) to allow the slider to ride on a thin film of air above the surface of the rotating disk. The write head is an inductive head with a thin film electrical coil located between the poles of a magnetic yoke. When write current is applied to the coil, the pole tips provide a localized magnetic field across a gap that magnetizes the recording layer on the disk into one of two distinct magnetic states (binary data bits). The magnetic material for use as the recording layer on the disk is chosen to have sufficient coercivity such that the magnetized data bits are written precisely and retain their magnetization state until written over by new data bits. Increasing the coercivity of the recording layer material is known to increase the thermal stability of the written bits, but requires a stronger write field. A proposed solution to this problem is TAMR, wherein the magnetic material in the media is heated locally to near its Curie temperature during writing so that the coercivity is low enough for writing to occur, but high enough for thermal stability of the recorded bits at ambient temperature.

Resistive heating devices have also been proposed for use in magnetic recording hard disk drives, but in a different application than TAMR. In this application the resistive heater is located near poles of the inductive write head. The heater expands the write poles and causes the pole tips to "protrude" from the ABS and thus move closer to the disk.

Data storage systems based on atomic force microscopy (AFM) have also been proposed for both thermally-assisted recording on magnetic media and for thermo-mechanical recording on polymer-based media. In both of these AFM-based data storage systems a resistive "nanoheater" is located at the tip of a cantilever to heat the media.

Materials proposed for use as resistive heaters in the above described applications include graphite-like carbon, aluminum (Al), chromium (Cr), nichrome (NiCr), tantalum (Ta) and titanium (Ti).

What is needed is a new material for resistive heating devices.

SUMMARY OF THE INVENTION

The invention is an electrically resistive heater in data storage systems wherein the resistive material is a chemically disordered $Cr_xV_{100-x}$ alloy. The alloy exhibits a high temperature coefficient of resistance ($T_{CR}$) so that the heater temperature can be inferred from its resistance, minimal resistance vs. temperature hysteresis upon heating and cooling, a high melting point, and temporal stability of resistance at elevated temperatures. The resistive heater is used in data storage systems, including magnetic recording hard disk drives that uses heaters to thermally assist the recording or induce protrusion of the write head pole tips to reduce the head-disk spacing, and atomic force microscopy (AFM) based systems that use "nanoheaters" on cantilever tips for either thermally-assisted recording on magnetic media or thermo-mechanical recording on polymer-based media.

For a fuller understanding of the nature and advantages of the present invention, reference should be made to the following detailed description taken together with the accompanying figures.

DETAILED DESCRIPTION OF THE INVENTION

The resistive material for the heating device should exhibit (1) a sufficiently high temperature coefficient of resistance ($T_{CR}$), so that the heater temperature can be inferred from its resistance, (2) negligible or preferably no resistance vs. temperature hysteresis upon heating and cooling, (3) a high melting point, and (4) temporal stability of resistance at elevated temperature.

It has been demonstrated that a range of solid solution (chemically disordered) chromium-vanadium (CrV) alloys meet these requirements. From published CrV phase diagrams it is known that $Cr_xV_{100-x}$ (for all values of x in atomic percent) does not exhibit any chemically ordered phases. Therefore no change of resistance vs. temperature due to chemical ordering will occur during any annealing processes that may be required during fabrication of the magnetic recording head. The melting point of all CrV alloy compositions is well above 1500° C.

To investigate the transport properties of CrV alloy films, 30 nm thick $Cr_xV_{100-x}$ films of various compositions were grown onto glass substrates by DC magnetron sputtering from alloy targets. The samples were mounted onto a copper block which was situated in a furnace. The temperature was increased from room-temperature to 300° C., decreased to 50° C., and then increased to 300° C. to measure the $T_{CR}$ and resistance vs. temperature hysteresis of the films. Finally the films were annealed for 30,000 seconds at 300° C. to measure temporal stability of their resistance. During temperature cycles the samples were kept under steady nitrogen flow to prevent oxidation.

Figure 1:
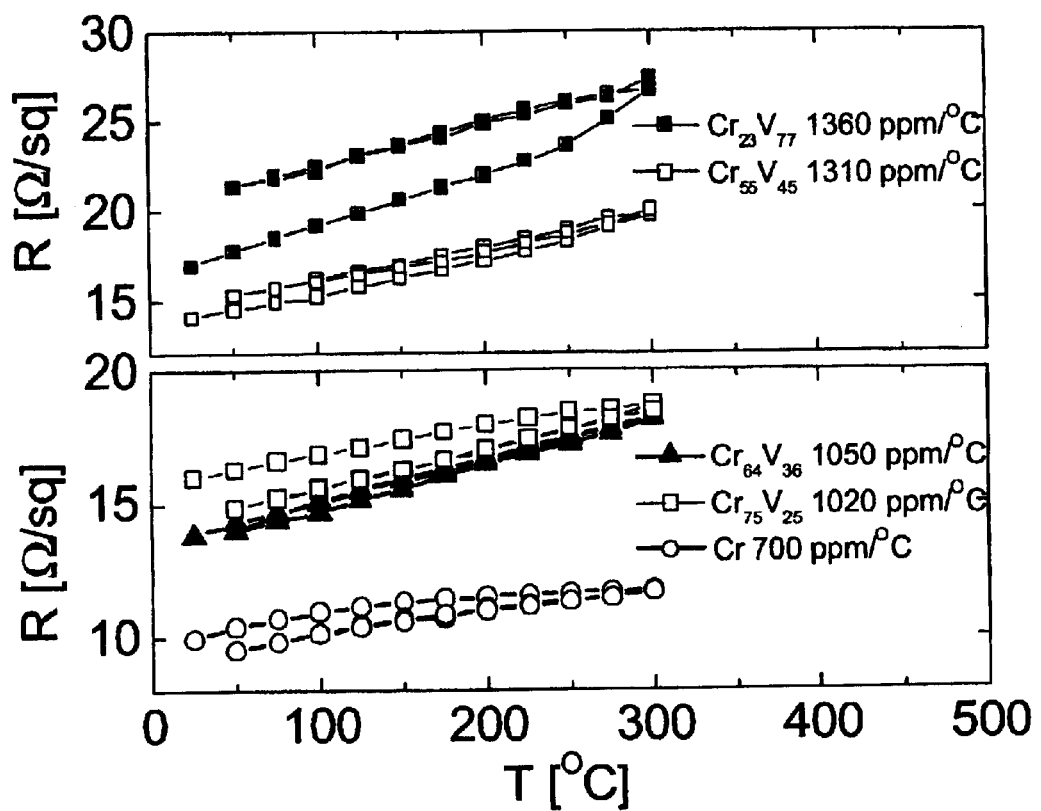
FIG. 1 is a resistance vs. temperature curve for various CrV alloys.
Figure 2:
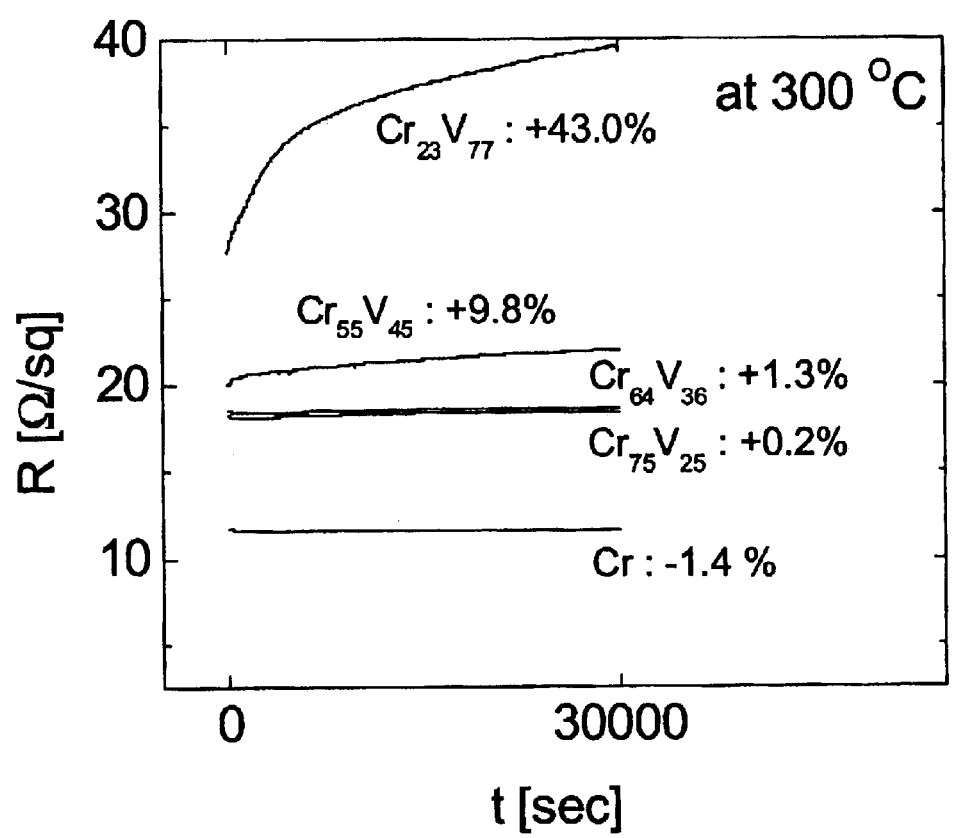
FIG. 2 is a resistance vs. time curve for various CrV alloys.

The sheet resistance of the films was measured by a classical four-point probe measurement to eliminate lead resistance. The resistance vs. temperature curves are shown in FIG. 1, and the resistance vs. time curves are shown in FIG. 2. The CrV compositions investigated were $Cr_{23}V_{77}$, $Cr_{55}V_{45}$, $Cr_{64}V_{36}$, $Cr_{75}V_{25}$ (wherein the subscript numerals represent atomic percent), and compared with pure Cr. While $Cr_{23}V_{77}$ exhibited a large resistance vs. temperature hysteresis of the resistance and a 43% increase in resistance upon annealing, $Cr_{55}V_{45}$ exhibited little hysteresis, but still a 9.8% increase in resistance upon annealing. $Cr_{64}V_{36}$ and $Cr_{75}V_{25}$ films exhibited outstanding resistance stability upon annealing, with only a 1.3% and 0.2% increase in resistance, respectively. $Cr_{64}V_{36}$ exhibited no hysteresis and $Cr_{75}V_{25}$ exhibiting some hysteresis, but the hysteresis vanished after the initial heat cycle.

The $T_{CR}$ values of the alloys decrease with increasing Cr content. The values were measured after the first heating cycle to eliminate resistance vs. temperature hysteresis and are 1360 ppm/° C. for $Cr_{23}V_{77}$, 1310 ppm/° C. for $Cr_{55}V_{45}$, 1050 ppm/° C. for $Cr_{64}V_{36}$, 1020 ppm/° C. for Cr75V25, and 700 ppm/° C. for Cr. These values are high enough to determine the heater temperature within a few degrees C. From the data shown in FIGS. 1 and 2 it can be concluded that solid solution $Cr_xV_{100-x}$ alloys, with Cr between about 50 and 90 atomic percent (50<x<90) are preferred since they exhibit (a) little or no resistance vs. temperature hysteresis, (b) little temporal change in resistance, and (c) $T_{CR}$ values that are sufficient to determine the heater temperature within a few degrees C. The $Cr_xV_{100-x}$ alloys of the present invention can also be formed by methods other that sputter deposition, such as electroplating, which would be preferred for thicker films.

Figure 3A:
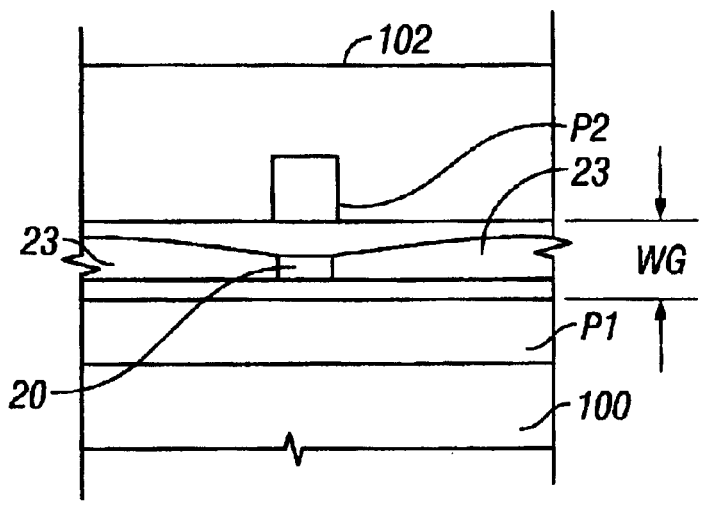
FIGS. 3A–3B illustrate an air-bearing surface (ABS) view and a side sectional view, respectively, of a portion of a TAMR write head having the heating device.
Figure 3B:
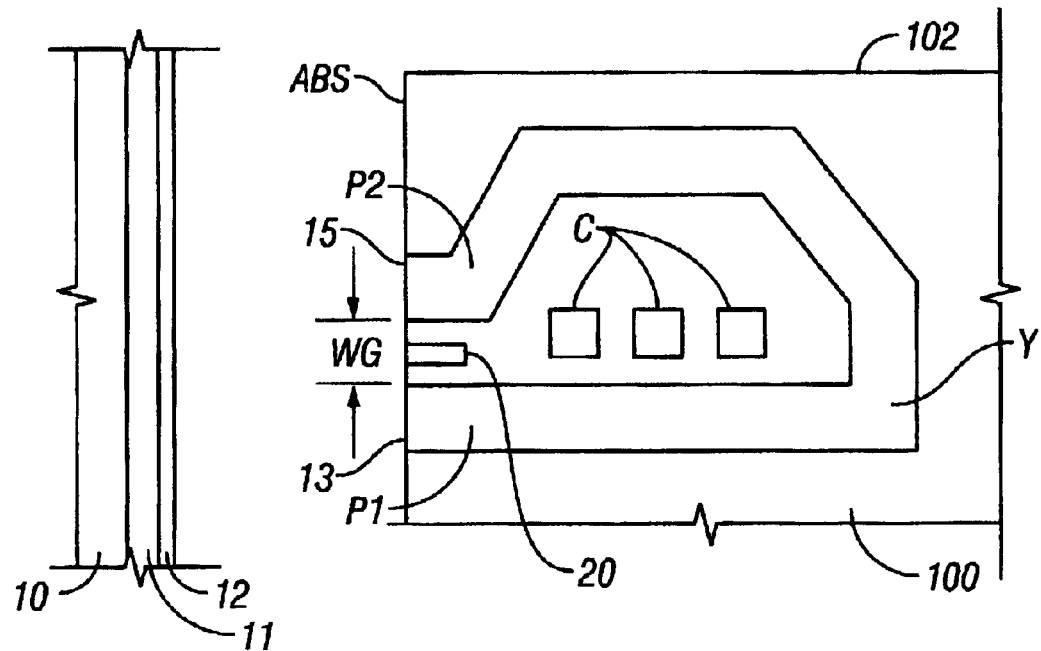

FIGS. 3A–3B illustrate a portion of a TAMR write head as described in U.S. Pat. No. 6,493,183. The inductive portion of the TAMR write head includes yoke Y and coil C (the segments of coil C are shown in sectional view in FIG. 3B). The head is mounted on the trailing end 102 of a head carrier, such as an air-bearing slider 100. As write current is passed through the coil C, a magnetic field is produced in the write gap WG between two magnetic poles P1 and P2, as shown in FIG. 3A where the write head pole tips 13, 15 are viewed from the slider's air-bearing surface (ABS) directly above the disk 10. FIG. 3B also shows a section of a disk 10 facing the ABS and having a magnetic recording layer 11 located beneath a protective overcoat 12. In this TAMR head the heating device is a resistive heater 20 built into the write gap WG between the poles P1, P2. FIG. 3A shows the electrical leads 23 connected to heater 20. The leads 23 are formed of a material that is a good electrical and thermal conductor, such as copper, rhodium or gold. The close proximity of the heater 20 to the disk 10 allows the magnetic layer 11 to be heated near or above its Curie temperature, to thereby lower its coercivity, while the data bit is being recorded by exposure to the magnetic field between the pole tips 13, 15. This magnetic field only has to overcome the lowered value of coercivity of the magnetic layer 11 to write the data bit. As the disk 10 rotates beneath the head, the magnetic layer 11 cools and retains the sign of the magnetic field. Although FIGS. 3A–3B show the heater 20 located in the write gap WG, the heater may also be located outside the write gap, for example above pole P2 or below P1 in FIG. 3A. Also, the heater may be formed as part of the coil C, as described in published U.S. Patent Application 2003/0021191A1, in which case portions of the coil serve as the electrical leads to the heater.

Figure 4A:
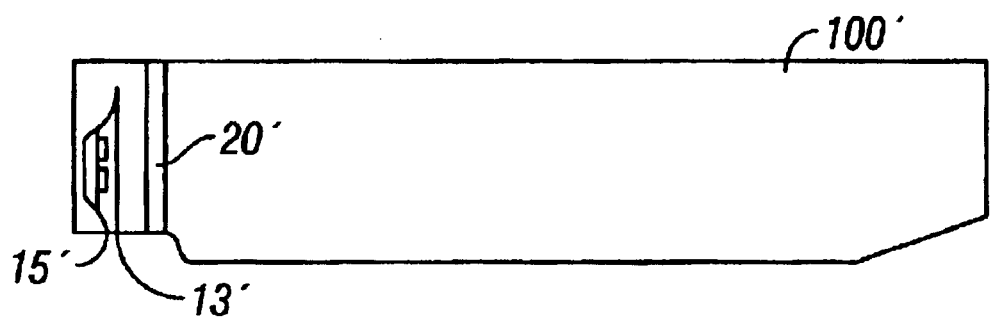
FIGS. 4A–4B illustrate an air bearing slider having the heating device for thermal protrusion with the write poles "recessed" in the absence of heat from the heating device (FIG. 4A) and with the write poles protruded in the presence of heat from the heating device (FIG. 4B).
Figure 4B:
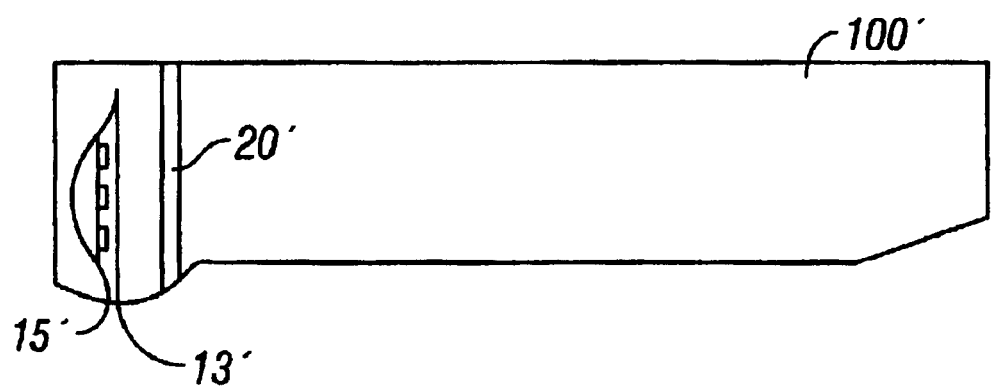

In addition to its use as a heater for heating the media in a TAMR system, the heater may also be used in a magnetic recording system to cause protrusion of the inductive write head's pole tips for the purpose of moving the pole tips closer to the media, as described in U.S. Pat. No. 5,991,113. This application of the heating device is shown in FIGS. 4A–4B. The heating device is a resistive heater 20' deposited as a film on the trailing end 102' of an air-bearing slider 100' that flies above the surface of the disk in a magnetic recording disk drive. The write head pole tips 13', 15' are "recessed" as shown in FIG. 4A when no current is applied to heater 20'. However, when current is applied the heat from heater 20' causes expansion of the write poles and protrusion of the pole tips 13', 15' closer to the disk, as depicted in FIG. 4B.

Figure 5A:
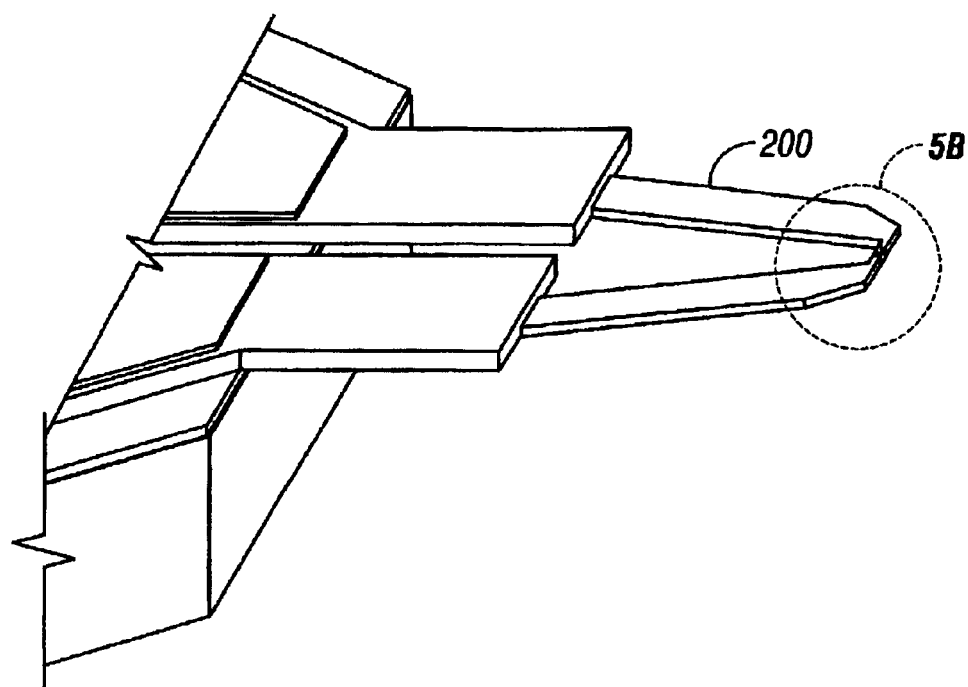
FIG. 5 is a perspective view of a cantilever with the heating device located on its tip.
Figure 5B:
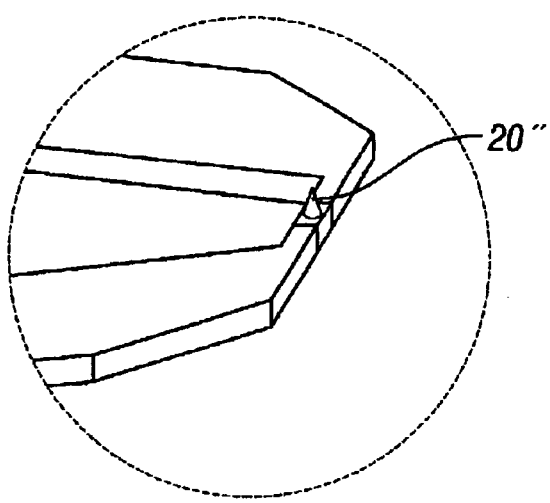

Still another application for the heating device is as a "nanoheater" located on the tip of a cantilever of the type for use in the proposed atomic-force-microscopy (AFM) based data storage. In one type of this application the nanoheater is used as in TAMR to heat the media to lower its coercivity, as described in U.S. Pat. No. 6,233,206. In another type of this application the nanoheater is part of a thermomechanical data storage system wherein the resistively heated nanoheater is used to "melt" portions of a polymer-type media, as described in U.S. Pat. No. 6,218,086 and by U. Drechsler, et al. "Cantilevers with nano-heaters for thermomechanical storage application fabricated with mix & match e-beam & optical lithography", presented at the Micro- and Nano-Engineering conference in Lugano, Switzerland on Sep. 16–19, 2002. An AFM-type cantilever 200 with a nanoheater 20" on its tip is shown in FIG. 5. The cantilever 200 can be formed of electrically conductive material or electrical conductors can be patterned on it to serve as the leads to the heater 20".

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording write head for writing on magnetic media comprising:
   a substrate;
   a magnetic yoke on the substrate, the yoke comprising first and second pole pieces, each said pole piece having a pole tip, the pole tips being spaced-apart to define a write gap;
   a coil layer located within the yoke for generating a magnetic field across the pole tips;
   a resistive heater for generating heat when electrical current is applied to said resistive heater, the heater comprising an alloy consisting essentially of Cr and V and having a composition of the form $Cr_xV_{100-x}$, where x is between about 50 and 90 atomic percent; and
   electrical leads connected to the resistive heater for providing electrical current to heat said resistive heater, the resistive heater having a higher electrical resistance than said leads.

2. The head according to claim 1 wherein the substrate is the trailing end of an air-bearing slider.

3. The head according to claim 1 wherein the resistive heater is located in the write gap.

4. The head according to claim 1 wherein the resistive heater forms a portion of the coil layer and wherein the coil layer includes the electrical leads.

5. The head according to claim 1 wherein the resistive heater is located near the pole tipsy, whereby heat from the heater causes protrusion of the pole tips.

6. The head according to claim 1 wherein heat from the resistive heater is directed to the magnetic media.

* * * * *

UNITED STATES PATENT AND TRADEMARK OFFICE
CERTIFICATE OF CORRECTION

PATENT NO. : 6,940,691 B2
DATED : September 6, 2005
INVENTOR(S) : Stefan Maat

It is certified that error appears in the above-identified patent and that said Letters Patent is hereby corrected as shown below:

<u>Column 4,</u>
Line 59, change "tipsy" to -- tips --.

Signed and Sealed this

Twenty-second Day of November, 2005

JON W. DUDAS
*Director of the United States Patent and Trademark Office*